Patented Sept. 17, 1946

2,407,645

UNITED STATES PATENT OFFICE 2,407,645

ALIPHATIC POLYCARBOXYLIC AMINO ACIDS AND PROCESS OF MAKING THEM

Frederick C. Bersworth, Verona, N. J., assignor to The Martin Dennis Company, Newark, N. J., a corporation of New Jersey No Drawing. Application June 21, 1943,
Serial No. 491,669

10 Claims. (Cl. 260—534)

This invention relates to polycarboxylic amino acids, and more particularly to a process for producing aliphatic poly-carboxylic amino acids and alkali metal salts thereof.

In the past, attempts have been made to make aliphatic polycarboxylic amino acids but they have all been characterized by relatively low yields or high cost and, consequently, have been of limited commercial value. The most successful of these previous methods is the choloracetate reaction as shown by Munz in U. S. Patent 2,130,-505. The reaction between formaldehyde, a cyanide, and an amine to form an amino acid is known, and has been used with aromatic amines and with ammonia; however, as far as I am aware that type of reaction has never been used satisfactorily with aliphatic amines.

It is an object of this invention to produce aliphatic polycarboxylic amino acids by a process whereby the yields are satisfactory. Another object is to produce these amino acids using an alkali cyanide, formaldehyde, and a primary or secondary aliphatic amine by a process whereby the reaction goes smoothly and is a substantial improvement over all prior methods. Another object is to show a procedure for making aliphatic polycarboxylic amino acids on a commercial scale. Still another object is to produce the alkali metal salts of these amino acids.

Briefly, these objects may be accomplished by preparing and maintaining a solution in which free unreacted aliphatic amine and alkali metal cyanide are both always present, and with the amine in excess over the cyanide, at least until the completion of the reaction, and adding slowly to said solution about one mol of formaldehyde for each amino-hydrogen of the amine to be replaced so that ammonia formed will be as completely removed as possible before more formaldehyde is added, and add about the same total molal quantity of an alkali metal cyanide at such a rate that the cyanide is maintained in excess over the formaldehyde. The solution is constantly agitated to prevent any local undesirable excess concentrations of the reactants and the mixture is heated to a suitable temperature. The alkali metal salt of the polycarboxylic amino acid is formed together with by-products. The free acid may be precipitated from this crude reaction product by adding any strong acid in proper quantity. The pure alkali metal salt may then be obtained by dissolving the acid in a solution of the proper hydroxide. Alternatively, it may be obtained by crystallization from the crude reaction product.

As this invention is based primarily upon the particular method of operation, an explanation of the chemistry of the reaction and therefore the reasons for the method used is given.

In the reaction mixture at any one time during, and prior to completion of, the reaction are present the compounds introduced, which include the alkali metal hydroxide, the amine, the alkali metal cyanide and formaldehyde together with products formed by the reaction, which products include ammonia. The object to be obtained is the promotion of the inter-reaction between the formaldehyde, the cyanide, and the amine while preventing the side reactions with ammonia or reaction of formaldehyde and the amine alone or formaldehyde and the cyanide alone. The rate of reaction of each of the possible combinations determines the method and conditions for carrying out the invention.

The sodium hydroxide does not enter into the reaction and therefore all of it may be introduced in the beginning. Its purpose is to provide a sufficiently alkaline reaction medium (if the other ingredients do not do so) to prevent hydrolysis of the cyanide with consequent formation of HCN, the presence of which is highly undesirable, because of both reactivity and toxicity. All the amine may also be introduced into the reaction vessel at the start because it does not react with either the cyanide or ammonia alone. Formaldehyde, however, reacts violently with the cyanide and rapidly with the amine and must be added in such a manner that as little free formaldehyde is present at any given time as possible, consistent with practical operating procedure. As the rate of reaction of formaldehyde is greater with the cyanide than with the amine, the concentration of the cyanide, in the presence of formaldehyde, must not be allowed to become too high or the formaldehyde will react with the cyanide alone to form glycolates, materially reducing the yield of desired product. It has therefore been found that no more than about 25% of the total cyanide necessary to react with all the replaceable hydrogen atoms attached to the amino nitrogen atoms of the amine (in the presence of formaldehyde) should be added, or present as free cyanide in the reaction mixture at any one time; smaller more frequent additions are preferable, and may amount to a continuous slow addition of the cyanide. But at all times the cyanide should be in excess of the formaldehyde and preferably by at least about 5% (calculated on the basis of total mols of formaldehyde or cyanide necessary to react with all the replaceable hydrogen atoms attached to the amino nitrogen atoms of the amine), in order that the amine, cyanide, and formaldehyde will react properly and without excessive formation of by-products. It has been further found that the yields of finished product become better as the concentration of free formaldehyde in the reaction mixtures is reduced. However, economic factors enter so that the yield obtained in practical operation is balanced against the time necessary for the reaction.

Ammonia which is formed by the reaction between the amine, cyanide, and formaldehyde must be removed from solution at once because if present in appreciable concentration, it will react with formaldehyde to form hexamethylenetetramine, a by-product which, because it lowers the yield, is undesirable.

The temperature at which the reaction takes place is also of importance; if it is too low, the reaction goes too slowly and the liberation of ammonia is not sufficiently complete; but if too high, colored polymers of cyanides form. The temperature of boiling is, of course, a function of the pressure; at reduced pressure the liquid may be boiled and the ammonia removed at a temperature below that at which the colored by-products form. It has been found that at about a ten-inch vacuum the reaction goes smoothly in the range of 60°–80° C. When the reaction is substantially completed some free alkali cyanide is still present; this may be reacted by introducing additional formaldehyde and operating at atmospheric pressure or somewhat higher, and raising the temperature to the boiling point (110–120° C. or somewhat higher). This additional formaldehyde (about 10% of the theoretical total formaldehyde is usually needed) should be added to replace the formaldehyde lost through by-product formation and by other means, and to make up the approximately 5% deficiency in formaldehyde (below cyanide) already referred to. This additional formaldehyde serves to increase the yield and to eliminate all traces of cyanide; the reaction product should be free from all cyanide when completed, at least for most commercial uses.

To avoid any local excess concentration, and to maintain a constant temperature through the mixture, it is desirable that it be constantly agitated.

Although the exact mechanism of the reaction is not known, it is believed that a nitrile is first formed by the reaction of the alkali cyanide with formaldehyde and the amine. The nitrile is immediately hydrolyzed and converted to the final sodium salt of the aliphatic amino carboxylic acid, also giving ammonia as a by-product. It has been found that if an alkali metal hydroxide is added to the mixture the hydrolysis of the alkali metal cyanide is repressed, thus preventing the formation of complex cyanide derivatives, and has the additional advantage of aiding the rapid and complete hydrolysis of the nitrile formed, which is desirable. The pH of the reaction mixture must be at least about 9 and preferably higher.

If the above sequence is not performed, the reaction may go with explosive violence and no appreciable yield of the desired product is formed, or the reaction will give many undesirable by-products.

To further illustrate the process of the invention the following examples are given. It is to be understood that these examples are illustrative rather than limiting.

*Example I*

10 mols of ethylene diamine as a 30% aqueous solution and 4 mols of solid caustic soda are placed in a steam heated kettle supplied with an agitator. Eight mols of sodium cyanide as a concentrated water solution (about 30%) are added and the solution heated to 60° C. About a 10 inch vacuum is applied to bring the liquid to incipient boiling. Formaldehyde (7.5 mols of 37–40% aqueous solution) is slowly added, the temperature being held at 60° C., and the solution vigorously stirred. Then, when the evolution of ammonia has substantially stopped, eight more mols of sodium cyanide, followed by eight mols of formaldehyde are added as before. This is continued until 40 mols of cyanide and forty mols of formaldehyde have been added. Then at the end about 2 mols more of formaldehyde are added, making forty-two in all, to remove any last traces of cyanide. About 8 to 10 hours are required to complete the reaction. The resulting product, referred to herein as the crude reaction product, is essentially an aqueous solution of the sodium salt of ethylene diamine tetraacetic acid.

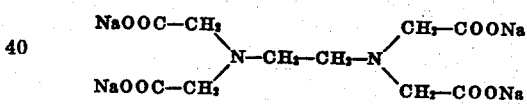

together with various by-products. On acidifying to a pH between .75 and 2, the corresponding free acid precipitates, and has been identified by ultimate analysis and electrometric titration curves.

*Example II*

Using the procedure of Example I, but with the following total quantities, a still better yield was obtained:

|  | Pounds |
|---|---|
| Ethylene diamine (70%) | 30 |
| NaOH (anhydrous) in 16 lbs. H₂O | 8 |
| Formalin (37%) | 137 |
| NaCN (96%) in 240 lbs. H₂O | 80 |

When the reaction was completed, 500 lbs. of solution were obtained which, when acidified with HCl (about 165 lbs. of 38% HCl, or a pH of about 1.5), produced a yield of 81.6% of theoretical of

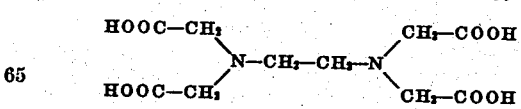

based upon the weight of ethylene diamine used.

I have found that any alkali metal cyanide or any alkali metal hydroxide may be substituted for the sodium cyanide and sodium hydroxide, respectively, used in the above examples; an alkali hydroxide is not essential though desirable, as already pointed out.

Any substance yielding formaldehyde under the conditions of this process, e. g. paraformaldehyde, may be used in place of formaldehyde in carrying out the process of this invention.

In place of ethylene diamine any aliphatic amine having at least two replaceable hydrogen atoms attached directly to the same or different amino nitrogen atoms may be used to produce the polyacetic acid aliphatic amino compounds described herein, and therefore such amines are equivalent to ethylene diamine, as illustrated in more detail below.

A few examples of various amines that have been reacted with an alkali metal cyanide and formaldehyde by the procedure of the foregoing examples, and the products obtained therefrom, are given below.

as the chloracetic acid process, so far as I am aware, and these salts and their corresponding acids are, I believe, new compounds.

As shown by the formulae given above, the sodium (or other alkali-metal) salt of the amino acid is formed in each case. These salts are extremely soluble, and in order to purify them, advantage is taken of the extreme insolubility of the corresponding acids. The solution is acidified to a pH of .75 to 2 with an acid and the pure amino acid separates out in the form of white crystals.

When a diamine containing two replaceable hydrogen atoms attached to each amino nitrogen atom is used as the amine to produce a tetra-

| Amine | Product |
|---|---|
| 1-2 propylene diamine | 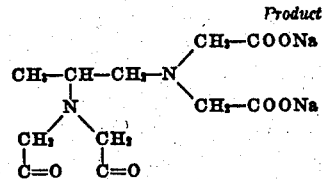 |
| Dipropylene triamine | 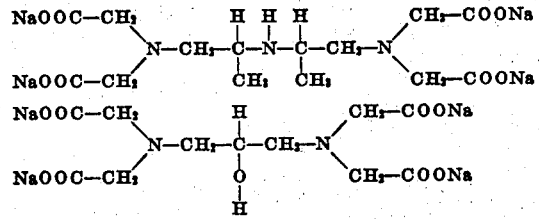 |
| 1-3 diamino propanol-2 | 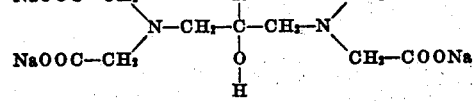 |
| Diethylene triamine | 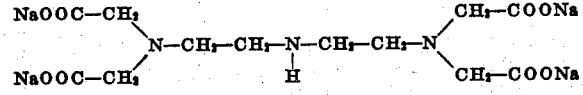 |
| N-butylamine | 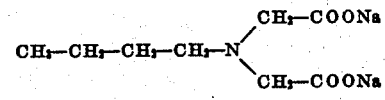 |
| N-monoethoxy ethylene diamine | 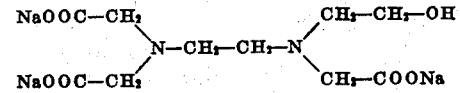 |
| Cyclohexyl amine | 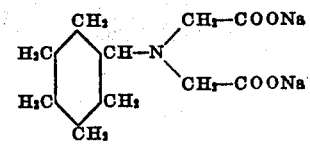 |
| Piperazine | 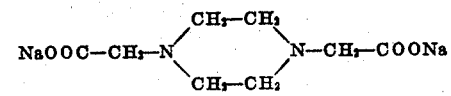 |

When polyamines having more than two amino nitrogen atoms are used, e. g. dipropylene triamine and diethylene triamine as shown in the foregoing tabulation, the hydrogen atoms on the intermediate amino nitrogen atoms as well as those on the terminal amino nitrogen atoms may be replaced by —CH$_2$COOM groups (M being an alkali metal), by carrying still further the reaction with formaldehyde and alkali metal cyanide. In so doing, the precautions already pointed out as to relative amounts of reactants must be observed; furthermore, since these higher-than-tetra substitutions are less readily made than those of tetra or lower, the reaction is preferably carried out at or above atmospheric pressure, and at or near the boiling point at the pressure used. The resulting penta- (and higher) alkali metal penta- (or higher) acetic acid salts cannot be made by previously described processes such substituted product, it may be desirable to make alkali metal salts in which fewer than four of the hydrogen atoms of the four —COOH groups are replaced by the alkali metal. Procedure for doing so is described below.

The tetra-alkali-metal salt may be prepared by merely adding sufficient solution of an alkali metal hydroxide to replace all the acid hydrogens of the free acid. The tri-alkali-metal salt is unstable except perhaps in solution and apparently cannot be isolated. The di-alkali salt is the least soluble of the alkali salts, and may be readily crystallized from solution. The following is an example of the preparation of the disodium salt of ethylene diamine tetraacetic acid. To 1000 gms. of the crude reaction product as obtained in accordance with Example I, 264 gms. of ethylene diamine tetracetic acid are added. The mixture is preferably heated to incipient boiling to increase the rate of reaction, and then the mixture is allowed to cool and crystallize. The crystals formed are filtered off, washed with the smallest possible amount of ice water, and dried to a constant weight, which is 452 gms. A representative sample of the product so prepared showed, upon analysis, 13.26% sodium against a theoretical of 13.70% for the disodium salt. The dialkali salt has a pH of about 5.3 and behaves like a weak acid, displacing $CO_2$ from carbonates and reacting with metals to form hydrogen. It is a white crystalline solid.

The monoalkali-metal salt may be prepared by heating together equal molecular quantities of the dialkali salt and the free acid in the presence of water. When the solution is cold, only the dialkali dissolves, but upon heating both go into solution. The mono salt may be recovered by evaporating the solution to dryness. If the above solution is cooled, the free acid precipitates out thus showing that the mono salt is unusual in that it is more stable at high temperature than at low temperature.

The chemical properties of these polycarboxylic amino-acids and their alkali salts make them valuable for many purposes. It is well known that the alkali salts are useful in water-softening and, when mixed with soap, as washing agents. These amino-acids also serve as starting materials for useful products such as amino polycarboxylic acid esters as shown in my application Serial No. 491,670 filed June 21, 1943.

This is a continuation-in-part of my copending application Serial No. 400,967, filed July 3, 1941.

I claim:

1. The process of preparing aliphatic polycarboxylic amino acids which comprises reacting an aliphatic amine having at least one replaceable hydrogen atom attached directly to an amino nitrogen atom, with an alkali metal cyanide and a formaldehyde-yielding substance under conditions sufficiently alkaline that there is substantially no hydrolysis of the said cyanide and in total amounts such that for each such replaceable hydrogen atom one molecule of said cyanide and one molecule of said formaldehyde-yielding substance are added during the reaction, while maintaining the amount of said free cyanide present in the reaction mixture at any one time at not more than about one quarter of the amount necessary to react completely with the original amine, and maintaining the amount of free formaldehyde-yielding substance present at any one time at less than one mol thereof per mol of said free cyanide present until substantial completion of the reaction of said amine has been effected, and removing ammonia from the reaction mixture so that substantially no free ammonia is present therein at any time during the reaction, and finally, after all the cyanide has been added, adding at least sufficient formaldehyde-yielding substance to react with any unreacted cyanide.

2. The process according to claim 1 wherein the reaction is carried out at a temperature of between about 60° C. and about 80° C. and at a pressure such that the reaction mixture is substantially at the boiling point at said temperature, until the major part of the reaction has been completed, and the temperature and pressure are then gradually raised while maintaining susbtantially boiling conditions, until completion of the reaction.

3. The process of preparing aliphatic polycarboxylic amino acids which comprises reacting an aliphatic amine having at least one replaceable hydrogen atom attached directly to an amino nitrogen atom, with an alkali metal cyanide and a formaldehyde-yielding substance under conditions sufficiently alkaline that there is substantially no hydrolysis of the said cyanide and in total amounts such that for each such replaceable hydrogen atom one molecule of said cyanide and one molecule of said formaldehyde-yielding substance are added during the reaction, while maintaining the amount of said free cyanide present in the reaction mixture at any one time at not more than about one quarter of the amount necessary to react completely with the original amine, and maintaining the amount of free formaldehyde-yielding substance present at any one time at less than one mol thereof per mol of said free cyanide present until substantial completion of the reaction of said amine has been effected, and removing ammonia from the reaction mixture so that substantially no free ammonia is present therein at any time during the reaction, and finally, after all of the cyanide has been added, adding a slight excess of formaldehyde-yielding substance over that necessary to react with any unreacted cyanide.

4. The process according to claim 1 wherein the formaldehyde-yielding substance is formaldehyde.

5. The process according to claim 1 wherein the amine is a primary aliphatic amine.

6. The process according to claim 1 wherein the amine is a primary aliphatic diamine.

7. The process of preparing the sodium salts of ethylene diamine tetraacetic acid which comprises reacting ethylene diamine with sodium cyanide and formaldehyde in the presence of sufficient sodium hydroxide to bring the pH to at least about 9 while maintaining a temperature of between about 60° C. and about 80° C. and a pressure such that the reaction mixture is substantially at the boiling point at said temperature, and maintaining the amount of free cyanide present in the reaction mixture at any one time at not more than one quarter of the amount necessary to react completely with the ethylene diamine, and maintaining the amount of free formaldehyde present in the reaction mixture at any one time at about five per cent less than the amount of sodium cyanide present, which five percent is based on the total quantity of sodium cyanide to be reacted, said sodium cyanide being added until four mols thereof have been added for each mol of ethylene diamine and the formaldehyde being added until at least about 95 per cent of the theoretically required four mols have been added, adding sufficient additional formaldehyde substantially completely to react with the unreacted sodium cyanide, increasing the pressure and heating the solution to boiling at a temperature at least about 110–120° C., and removing ammonia from the reaction mixture so that substantially no free ammonia is present therein at any time.

8. The process according to claim 1 wherein the amine is diethylene triamine.

9. The process according to claim 1 wherein the amine is n-butylamine.

10. The process of preparing aliphatic polycarboxylic amino acids which comprises reacting an aliphatic amine having at least one replaceable hydrogen atom attached directly to an amino nitrogen atom, with an alkali metal cyanide and a formaldehyde-yielding substance under conditions sufficiently alkaline that there is substantially no hydrolysis of the said cyanide, while maintaining the amount of said free cyanide present in the reaction mixture at not more than about one quarter of the amount necessary to react completely with the original amine, and maintaining the amount of free formaldehyde-yielding substance present at less than one mol thereof per mol of said free cyanide present and continuing to add said cyanide and said formaldehyde-yielding substance under said conditions until each said replaceable hydrogen atom has been replaced by the radical —$CH_2COOM$ wherein M is an alkali metal, and removing ammonia from the reaction mixture so that substantially no free amomnia is present therein at any time during the reaction, and finally, after all the cyanide has been added, adding a slight excess of formaldehyde-yielding substance over that necessary to react with any unreacted cyanide.

FREDERICK C. BERSWORTH.